(12) United States Patent
Szczerba et al.

(10) Patent No.: US 7,841,673 B2
(45) Date of Patent: Nov. 30, 2010

(54) VEHICLE BRAKING SYSTEM

(75) Inventors: Joseph F. Szczerba, Grand Blanc, MI (US); Adrian B. Chernoff, Boulder, CO (US)

(73) Assignee: GM Global Technology Operations, Inc., Detroit, MI (US)

( * ) Notice: Subject to any disclaimer, the term of this patent is extended or adjusted under 35 U.S.C. 154(b) by 915 days.

(21) Appl. No.: 11/432,741

(22) Filed: May 11, 2006

(65) Prior Publication Data

US 2007/0262640 A1 Nov. 15, 2007

(51) Int. Cl.
*B60T 13/00* (2006.01)
(52) U.S. Cl. .................... 303/20; 303/3; 303/15
(58) Field of Classification Search ........ 303/3, 303/15, 20, 125, 122, 166, 191, 193; 188/106 R; 701/70, 71; 180/78
See application file for complete search history.

(56) References Cited

U.S. PATENT DOCUMENTS

| 4,078,628 | A | 3/1978 | Reichenberger | 180/77 |
| 5,366,281 | A | 11/1994 | Littlejohn | 303/3 |
| 5,823,636 | A | 10/1998 | Parker et al. | 303/3 |
| 6,305,758 | B1 | 10/2001 | Hageman et al. | 303/115.2 |
| 6,390,565 | B2 | 5/2002 | Riddiford et al. | 303/3 |
| 6,424,900 | B2 | 7/2002 | Murray et al. | 701/48 |
| 7,344,200 | B2 * | 3/2008 | Borroni-Bird et al. | 303/15 |
| 7,509,195 | B2 * | 3/2009 | Borroni-Bird et al. | 701/41 |
| 2005/0067889 | A1 * | 3/2005 | Chernoff et al. | 303/20 |

* cited by examiner

*Primary Examiner*—Pam Rodriguez
(74) *Attorney, Agent, or Firm*—Quinn Law Group, PLLC

(57) ABSTRACT

A vehicle braking system is responsive to vehicle conditions to alter the response of the braking system for a given driver input. In one mode, the vehicle conditions are conditions that are indicated by sensor in real time. In another mode, the vehicle conditions are historical conditions, such as trends, patterns, etc. The braking system provides braking responses that are appropriate for vehicle conditions and enables personalization of the braking system to accommodate individual driver characteristics.

15 Claims, 3 Drawing Sheets

VEHICLE BRAKING SYSTEM

TECHNICAL FIELD

This invention relates to vehicle braking systems that modify actuator responses in response to the existence of a predetermined condition.

BACKGROUND OF THE INVENTION

Vehicle braking systems typically include a selectively engageable friction device, such as a brake disk or brake drum, that is configured to selectively provide resistance to the rotation of at least one vehicle wheel. An input member is mechanically connected, through mechanical or hydraulic linkages, to the friction device such that manipulation of the input member by a driver causes engagement of the friction device.

SUMMARY OF THE INVENTION

A braking system for a vehicle includes a driver-operable control input device having a selectively movable member. A braking system actuator has an actuator characteristic with a selectively variable actuator characteristic value. The braking system is sufficiently configured such that the variable actuator characteristic value is related to the position of the member according to a first relationship when a first predetermined condition exists, and is related to the position of the member according to a second relationship different from the first relationship when a second predetermined condition exists.

A corresponding method is also provided for controlling a brake system in a vehicle that is characterized by a vehicle condition having a variable vehicle condition value. The method includes monitoring the variable vehicle condition value, monitoring the position of a movable member of a driver-operable input device, and determining whether the variable vehicle condition value indicates that a predetermined condition exists. The method further includes causing an actuator characteristic of a braking system actuator to be related to the position of the movable member in accordance with a first relationship in response to the variable vehicle condition value not indicating that the predetermined condition exists, and causing the actuator characteristic of the braking system actuator to be related to the position of the movable member in accordance with a second relationship in response to the variable vehicle condition value indicating that the predetermined condition exists.

In an exemplary embodiment, the method includes a "predictive mode," which further includes generating a set of data by storing the variable vehicle condition value to create a history of the variable vehicle condition value over time. In the predictive mode, the predetermined condition is a statistical condition of the data in the data set.

The braking system and the method of the invention may provide braking modes appropriate for various driving conditions and may provide braking styles that are personalized to a particular driver.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
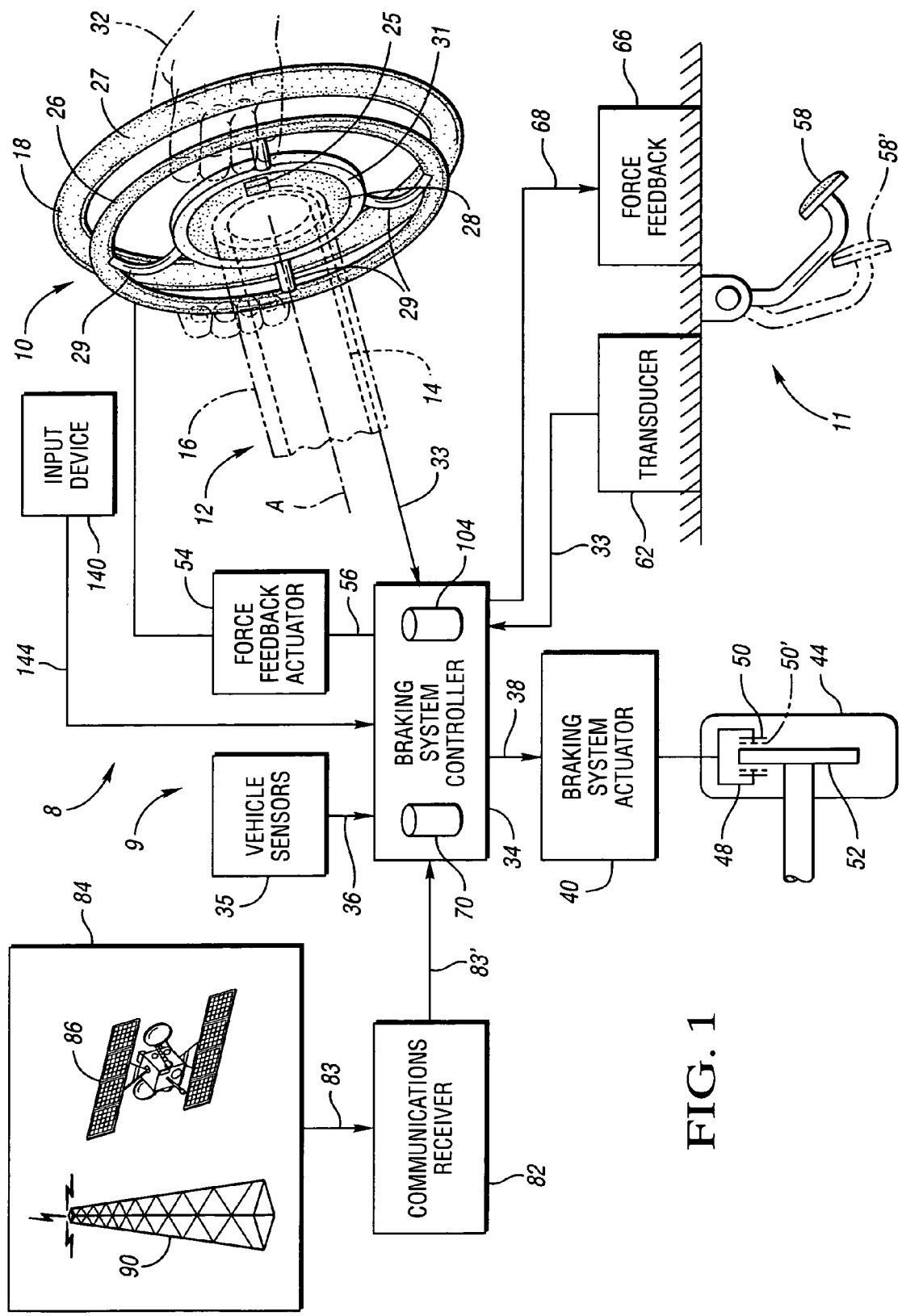
FIG. 1 is a schematic depiction of a vehicle including a braking system with driver-operable input members and braking system actuators.

Referring to FIG. 1, a vehicle 8 includes a braking system 9. The braking system 9 in the embodiment depicted includes a first driver-operable control input device 10 and a second driver-operable control input device 11. The first driver-operable control input device 10 is configured to be operable by hand. More specifically, the vehicle 8 includes a steering column 12. The steering column 12 includes a steering shaft 14 rotatably supported on a stationary structural housing 16. The vehicle 10 also includes a steering hand wheel 18 connected to the steering shaft 14 for unitary rotation therewith about axis of rotation A.

The driver-operable input device 10 includes an input member, namely braking ring 26, that is supported by the steering column and adjacent the backside of the rim 27 of the steering wheel 18 such that the braking ring and the steering wheel have a common axis of rotation A. The braking ring 26 is connected to the hub 28 of the steering wheel 18 by spokes 29 and an annular support portion 31. The braking ring 26 is movable between a default position, as shown in FIG. 1, and an aft position with respect to the vehicle 10, and is preferably spring biased in the default position. Thus, the relative position of the braking ring 26 with respect to some portion of the vehicle 8, such as the steering wheel 18, is selectively variable.

The braking ring 26 is a member that is manipulable by a driver of the vehicle 10. That is, the driver exerts force on the braking ring 26 to move the ring 26 aft, i.e., rearward toward the driver, to indicate driver intent to apply brakes. The braking ring 26 is operatively connected to a transducer 25 that converts the effects of driver manipulation of braking ring 26 to electronic braking control signals 33. More specifically, the transducer 25 employs various sensors to measure, and generate signals 33 indicative of, the relative position of the braking ring 26 with respect to the steering wheel 18, the force exerted on the braking ring 26 by a driver's hand 32, and the velocity of the braking ring 26 with respect to the steering wheel 18.

Input device 10 is hand-operated, that is, it is configured and positioned such that a vehicle driver in a driving position can access and operate the input device 10 with a hand 32, rather than with a foot. The transducer 25 transmits the electronic control signals 33 to a braking system controller 34. A controller typically includes a microprocessor, ROM and RAM and appropriate input and output circuits of a known type for receiving various input signals and for outputting various signals.

The vehicle 8 is characterized by characteristics, or conditions, that have variable values. Exemplary vehicle characteristics, or conditions, having variable values include, but are not limited to, angular wheel velocity, engine speed, steering angle of the wheels, transmission speed ratio, applied brake caliper force, hand brake pressure, vertical wheel displacement (i.e., the state of the suspension), wheel traction, wheel torque, vehicle acceleration (both linear and lateral), antilock braking, tire pressure, braking cycle, brake crunching, etc. Vehicle characteristics, or conditions, also include characteristics of the vehicle operating environment, which may be external to the vehicle, such as the geographic location of the vehicle, the ambient atmospheric temperature, the relative humidity of the ambient atmosphere, the inclination of the surface on which the vehicle is traveling, the proximity of other vehicles or objects to the vehicle 8, road conditions, traffic congestion, etc.

Sensors 35 within the vehicle 8 monitor the vehicle operating environment and various vehicle components. The sensors 35 may include position sensors, velocity sensors, acceleration sensors, pressure sensors, force and torque sensors, thermometers, barometers, radar, proximity sensors, etc. The sensors 35 transmit sensor signals 36 to the controller 34. The sensor signals 36 are indicative of the values of the vehicle characteristics monitored. Within the scope of the claimed invention, a "value" includes not just numerical values, but also binary values, such as "on/off," "engaged/disengaged," mode selected, etc.

The controller 34 is configured to process the electronic control signals 33 and the sensor signals 36 according to an algorithm to generate actuator control signals 38. For example, the controller may process both the position and velocity of the braking ring to provide both normal and panic stopping in generating actuator control signals 38.

Actuator control signals 38 are transmitted to a braking system actuator 40 that is configured to generate predetermined mechanical responses to the actuator control signals 38. Those skilled in the art will recognize a variety of braking system actuators that may be employed within the scope of the claimed invention. For example, the braking system actuator 40 may be an electro-hydraulic actuator, a servomotor, a solenoid, etc. The braking system actuator 40 is operatively connected to a wheel 44 and selectively causes resistance to the rotation of the wheel 44 in response to actuator control signals 38 from the braking system controller 34. In the embodiment depicted, the braking system actuator 40 is operatively connected to brake calipers 48 and selectively causes the calipers 48 to engage a brake rotor 52.

More specifically, the calipers are connected to pads 50. The actuator 40, in response to the actuator control signals 38, causes the movement of the calipers, which in turn cause the pads to move to various positions, such as the one shown at 50', to contact the rotor 52 with selectively variable force. Within the scope of the claimed invention, other brake configurations may be employed, such as the use of electric motors for regenerative braking.

The actuator 40 is characterized by at least one actuator characteristic that is related to the resistance to the rotation of the wheel 44, and that has a selectively variable value. An exemplary actuator characteristic is the relative position of a member of the actuator with respect to another object, wherein the value of the actuator characteristic is the distance between the member and the other object. For example, if the actuator is a solenoid, the position of the spindle of the solenoid may be the selectively variable actuator characteristic; if the actuator is a motor, then the rotational position of the rotor may be the selectively variable characteristic. The selectively variable actuator characteristic may be measured directly or indirectly, such as by the position of a member connected to the actuator (e.g., the position of the brake caliper 48 or the pads 50) or an effect caused by the actuator. Similarly, the brake torque may be the actuator characteristic or indicative of the actuator characteristic. The actuator characteristic is controllable by the controller 34 via the control signals 38.

Active force feedback is preferably employed to simulate vehicle dynamic conditions and enhance driving performance. With active force feedback, a force feedback actuator 54 is operatively connected to the braking ring 26 to selectively cause resistance to movement of the braking ring 26 by the driver of the vehicle. The force feedback actuator, and the resistance to movement of the braking ring 26, are controllable by the controller 34 via control signals 56.

The second driver-operable control input device 11 includes a foot-operated brake pedal 58. The pedal is biased in a default position, as shown at 58, and is selectively movable from the default position to a depressed position, shown at 58'. A transducer 62 employs various sensors to measure, and generate signals 33 indicative of, the relative position of the brake pedal 58 with respect to the default position, the force exerted on the brake pedal 58, and the velocity of the brake pedal 58 in moving from the default position. A force feedback actuator 66 is connected to the pedal 58 to provide resistance to movement of the pedal from the default position.

The controller 34 processes the signals 33 from the second input device 11 in the same manner described above with respect to the signals from the first input device 10. Similarly, the force feedback actuator 66, and the resistance to movement of the pedal 58, are controllable by the controller 34 via control signals 68.

In the embodiment depicted, the braking system 9 includes a wireless communications receiver 82, which is considered a "sensor" in the context of the present invention. The communications receiver 82 is configured to receive wireless signals 83 from offboard communications devices 84, such as at least one satellite 86 and radio transmitter towers 90. The signals 83 are transmitted from the receiver 82 to the controller 34 in electronic form 83'. Other sources of wireless signals 83 may include other vehicles, networks, etc., within the scope of the claimed invention. For example, another vehicle may transmit a signal 83 indicative of rapid braking to vehicle 8. Similarly, vehicle 8 may be likewise equipped to transmit signals 83 to other vehicles.

In an exemplary embodiment, the receiver 82 and controller 34 are configured as a global positioning system (GPS) to determine the geographic location of the vehicle 8. The controller 34 may also receive information concerning weather, traffic, terrain, etc., from the satellite 86 and the towers 90 via the communications receiver 82.

Figure 2:
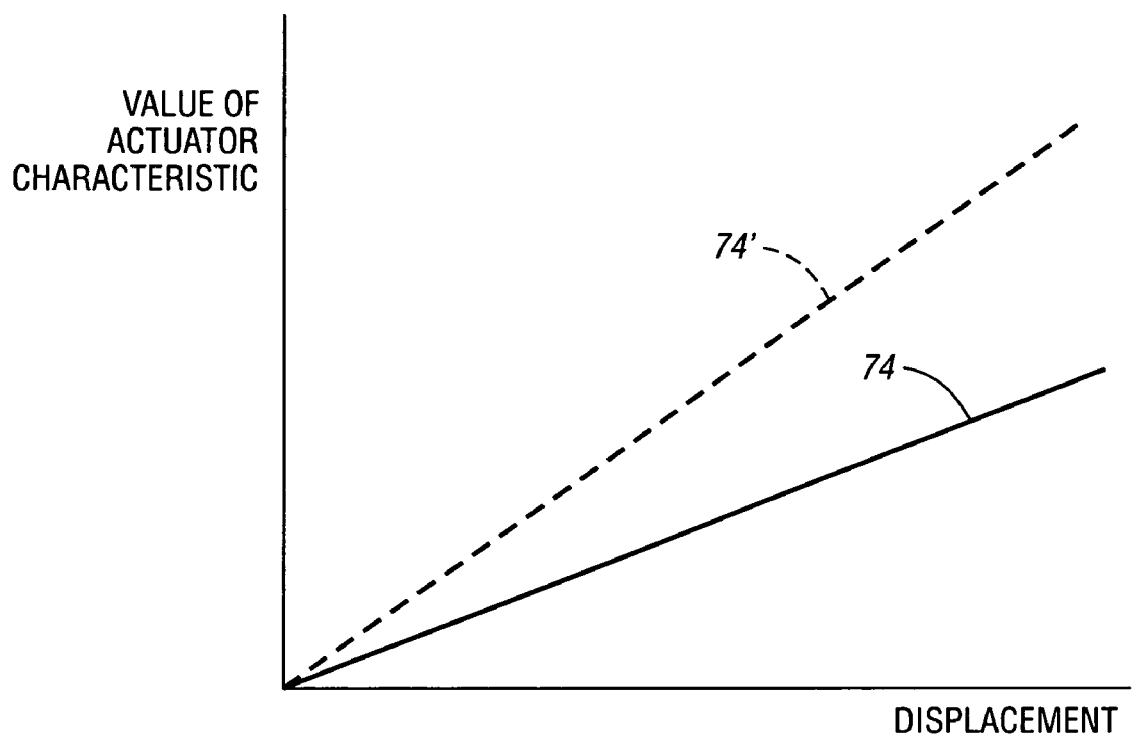
FIG. 2 is a graph showing an exemplary relationship between a characteristic of one of the actuators of FIG. 1 and the position of an input member of FIG. 1.

The controller 34 includes a database 70 that stores an algorithm and data that the controller 34 uses to process signals 33, 36, 83' to produce actuator control signals 38 and control signals 56, 68. The algorithm and data stored in the database 70 is such that the controller generates control signals 38 that cause the actuator characteristic value to be related to the displacement of the braking ring 26 or the brake pedal 58 from their respective default positions according to a predetermined relationship. Referring to FIG. 2, a first relationship between the displacement of the input device member (i.e., the braking ring or the brake pedal) and the value of the actuator characteristic is depicted by line 74. In the first relationship, as the displacement of the member increases, the controller causes the value of the actuator characteristic to increase proportionally.

Figure 3:
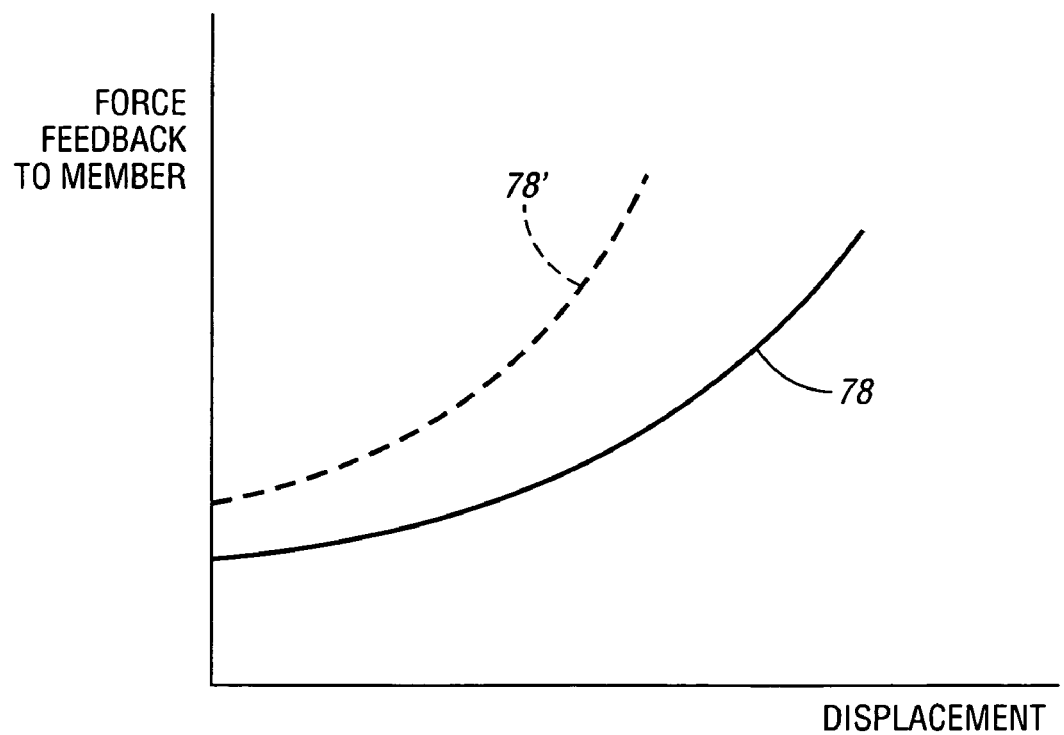
FIG. 3 is a graph showing an exemplary relationship between a characteristic of the force feedback actuators of FIG. 1 and the position of an input member of FIG. 1.

With reference again to FIG. 1, the algorithm and data stored in the database 70 is such that the controller generates control signals 56, 68 that cause the resistance provided by the actuators 54, 66 to be related to the displacement of the braking ring 26 or the brake pedal 58 from their respective default positions according to a predetermined relationship. Referring to FIG. 3, a first relationship between the resistance provided by a force feedback actuator (shown at 54, 66 in FIG. 1) and the displacement of one of the movable braking members (i.e., the braking ring 26 or the brake pedal 58) is depicted by line 78. In the embodiment depicted, the resistance to displacement of the movable braking member increases exponentially with increasing displacement of the movable member 26, 58 from its default position.

The relationships depicted in FIGS. 2 and 3 are exemplary. Those skilled in the art will recognize a variety of relationships that may be employed within the scope of the claimed invention. For example, the relationship depicted by line 78 may be linear, and the resistance may be constant irrespective of the displacement of a movable member from its default position.

Referring again to FIG. 1, the controller 34 is configured to alter the relationship between the actuator characteristic value and the displacement of the braking ring 26 and the displacement of the brake pedal 58, depending on the sensor signals 36, 83'. The alteration of the relationship may take place in two modes, namely, a real time mode and a predictive mode.

Figure 4:
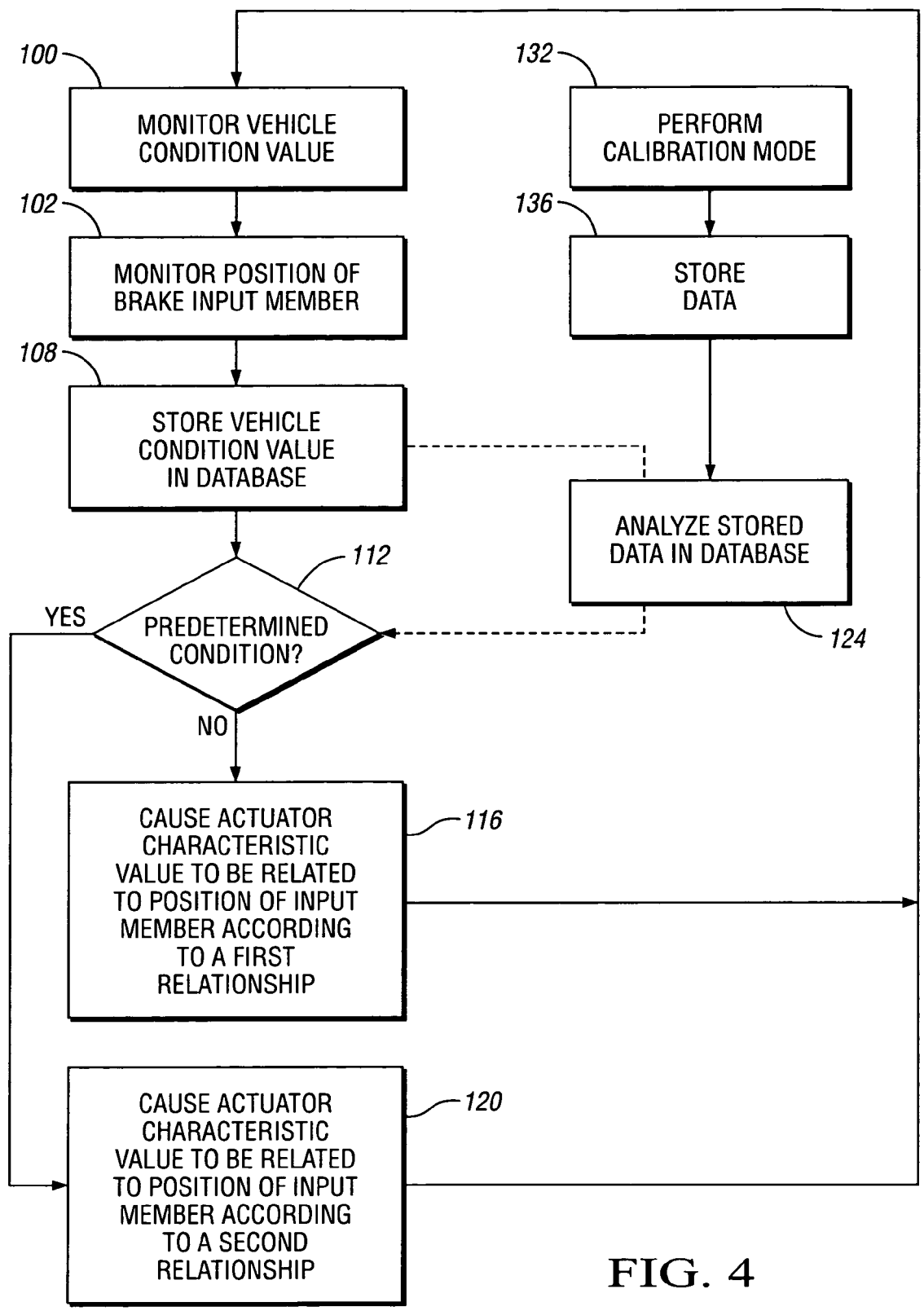
FIG. 4 is a flow chart depicting a method and an exemplary control logic for the braking system of FIG. 1.

FIG. 4 is a flow chart depicting a method and an exemplary control logic for the braking system. Referring to FIGS. 1 and 4, at least one sensor 35, 82 monitors the value of a variable vehicle condition at step 100. Transducers 25, 62 monitor the position of the brake ring 26 and the pedal 58, respectively, at step 102. It should be noted that the variable vehicle condition value may be calculated or derived by the controller from more than one sensor, such as brake specific fuel consumption, motor efficiency, or the difference between a component temperature and ambient temperature. The controller 34 receives the signals 36, 83' from the sensor 35, 82 and generates a set of data by storing the vehicle condition value indicated by the signal or signals 36, 83' in a database contained in storage medium 104 at step 108. The controller stores the value of the vehicle condition at predetermined time intervals, or upon the occurrence of predetermined events, to produce a history of the vehicle condition value. For example, the controller may store the value of the variable condition every 0.01 seconds, or every time the controller reiterates the control logic shown in FIG. 4.

The "real time mode" involves determining the presence or absence of a predetermined condition as indicated by the sensors 35, 82. The controller 34 determines whether the signals 36, 83' indicate the existence of at least one predetermined condition at decision block 112. If the answer at decision block 112 is no, i.e., the signals do not indicate the existence of at least one predetermined condition, then, at step 116 the controller 34 generates control signals 38 configured to cause the actuator characteristic value of actuator 40 to be related to the position of the input member, i.e., brake pedal 58 or ring 26, as indicated by the transducers 25, 62, and signals 33, according to a first relationship, such as the relationship depicted at 74 in FIG. 2. At step 116, the controller 34 also generates control signals 56, 68 configured to cause the actuator characteristic value of actuators 54, 66 to be related to the position of the input member, i.e., brake pedal 58 or ring 26, as indicated by the transducers 25, 62, and signals 33, according to a first relationship, such as the relationship depicted at 78 in FIG. 3.

If the answer at decision block 112 is yes, that is, if the signals indicate the existence of at least one predetermined condition, then at step 120 the controller 34 generates control signals 38 configured to cause the actuator characteristic value of actuator 40 to be related to the position of the input member, i.e., brake pedal 58 or ring 26, as indicated by the transducers 25, 62, and signals 33, according to a second relationship, such as the relationship depicted at 74' in FIG. 2. At step 120, the controller 34 also generates control signals 56, 68 configured to cause the actuator characteristic value of actuators 54, 66 to be related to the position of the input member, i.e., brake pedal 58 or ring 26, as indicated by the transducers 25, 62, and signals 33, according to a second relationship, such as the relationship depicted at 78' in FIG. 3.

By employing the relationship shown at 74', the actuator characteristic is more responsive to increasing displacement of the input member than the relationship shown at 74. For example, if the actuator characteristic is the force with which the brake calipers contact the brake disk, then the rate of increase of brake caliper force with respect to input member displacement is higher with the relationship shown at 74' than with the relationship shown at 74, resulting in more responsive braking. In the real time mode, the controller alters the relationship based on vehicle conditions monitored by the sensors 35, 82 and indicated by the signals 36, 83'.

Further, when the controller determines that the predetermined condition exists and employs the second relationship shown at 78' in FIG. 3, the amount of force supplied by the feedback actuator increases, thereby requiring more force on the part of a vehicle operator to displace the braking input member compared to the relationship shown at 78.

Exemplary predetermined conditions in the real time mode include being in a predetermined geographic region, as determined by the communications receiver and the controller functioning as a GPS, certain weather conditions as monitored by the sensors 35 or communicated to the communications receiver 82, traffic conditions as indicated by signals 83 from tower 90, road conditions as monitored by sensors 35 (such as by measuring wheel slip), etc.

In the "predictive mode," the braking system 9 analyzes the set of data produced at step 108 to "learn." More specifically, at step 124, the controller 34 analyzes the set of data accumulated in the database of storage medium 104 during step 108. For the predictive mode, the relative position, relative velocity, etc. of input members 26, 58 are considered variable vehicle conditions, and the values indicated by signals 33 from the transducers 62, 25 are preferably stored at step 108 as variable vehicle conditions values. The controller 34 performs a statistical analysis on the set of data accumulated in step 108 to determine if a statistical predetermined condition exists at step 112. If the statistical predetermined condition exists, then the controller 34 performs step 120. If the statistical predetermined condition does not exist, then the controller 34 performs step 116.

Although any statistical predetermined condition may be employed within the scope of the claimed invention, in the preferred embodiment, the set of data compiled in the storage medium 104 preferably relates to the displacement of one or both input members. More specifically, the controller 34 stores signals 33 sent from the sensors in transducers 25, 62 at step 108 so that the set of data stored in the storage medium 104 describes how the vehicle driver has employed the input members to brake the vehicle.

The analysis of the stored data at step 124 may include, for example, determining the maximum force applied to the input member, the average force applied to the input member, the average rate of displacement of the input member, the average displacement of the input member during braking operations, the maximum displacement of the input member, the frequency of member displacement, etc.

The statistical analysis at step 124 may yield information about the driver and the use of the brakes to optimize the braking system for the driver. For example, if the predetermined condition at step 112 is indicative of aggressive braking, e.g., if the predetermined condition is the average force applied to the input member being higher than a predetermined amount or the average rate of displacement of the input member being higher than a predetermined amount, then the second relationship at step 120 can be 74' or 78' to accommodate an aggressive driving style, and the first relationship at step 120 can be 74 or 78 to accommodate a less aggressive driving style. Thus, the actuator 40 may become more responsive to input member displacement, and the feedback actuator 54, 66 may increase force feedback to accommodate the driver's aggressive braking style.

Similarly, if the statistical predetermined condition at step 112 is indicative of reduced strength of a vehicle driver, then the second relationship may be characterized by a reduced amount of force or displacement of the input member necessary to cause a change in the actuator characteristic compared to the first relationship.

In a preferred embodiment, the controller 34 also analyzes the set of data at step 124 to determine the frequency of braking, i.e., the quantity of times that a driver displaces an input member within a predetermined time period. If the frequency of braking is higher than a predetermined amount, then it may be indicative of stop and go driving conditions. Correspondingly, if the frequency of braking is higher than a predetermined value at step 112, then the second relationship may be characterized by a smaller amount of force provided by the force feedback actuator than the first relationship.

It should be noted that step 112 may also be considered determining whether a first or a second predetermined condition exists, where the second predetermined condition is the converse of the first predetermined condition. If the first predetermined condition does not exist, then the second predetermined condition exists.

It should be further noted that, more than two predetermined conditions may be monitored within the scope of the claimed invention, with each of the predetermined conditions resulting in a different relationship between an actuator characteristic and the position of the input member. For example, each discrete vehicle condition value may be a predetermined condition with a corresponding unique relationship between the actuator characteristic value and the position of the input member.

In a preferred embodiment, the braking system 9 is configured for a calibration mode. More specifically, the controller 34 tests a driver's braking during a calibration mode at step 132 and stores data received from the sensors of transducers 25, 62 during the calibration mode in the storage medium 104 at step 136 for use at step 124. Data collected during the calibration mode at steps 132 and 136 may include maximum force applied to the input member, maximum displacement of the input member, etc. During the calibration mode, the controller 34 does not generate control signals 38 to cause a response from the actuator 40.

The braking system may also include an input device 140, such as a switch, keyboard, etc., that is manipulable to cause the controller 34 to alternate between different modes having different relationships between the actuator 40 characteristic and the displacement of the input member, and relationships between the force feedback and the displacement of the input member. More specifically, input device 140 is a sensor monitoring which of several driving modes is selected by a driver (step 100), and transmits signals 144 to the controller. The predetermined condition at step 112 may be whether a particular mode is selected via input device 140. The modes may be considered themed driving modes, such as city driving, country driving, sport driving, cruising, etc.

The sensors 35 may also be configured to monitor which of several drivers is driving the vehicle 8. The particular driver of the vehicle may be a predetermined condition at step 112 that results in an alteration of the relationships depicted in FIGS. 2 and 3. Similarly, each driver may have a separate database on storage medium 104 so that the controller 34 can distinguish between the braking characteristics and past braking behaviors of the several drivers. Controls and user settings may be conveyed, transmitted, uploaded, or downloaded from within the vehicle or remotely through a remote device such as a personal digital assistant (PDA), key fob, radio frequency identification transmitter, fingerprint ID or other biometrics, key card, seat sensors configured to sense the weight of a driver, etc.

Vibration of the hand brake 26 may be accomplished through software and may notify the driver to brake if proximity sensors indicate that an object is within a predetermined distance.

While the best mode for carrying out the invention has been described in detail, those familiar with the art to which this invention relates will recognize various alternative designs and embodiments for practicing the invention within the scope of the appended claims.

The invention claimed is:

1. A braking system for a vehicle comprising:
   a driver-operable control input device having a selectively movable member; and
   a braking system actuator having an actuator characteristic with a selectively variable actuator characteristic value;
   wherein the braking system is sufficiently configured such that the variable actuator characteristic value is dependent upon the position of the member according to a first relationship when a first predetermined condition exists; and wherein the braking system is sufficiently configured such that the variable actuator characteristic value is dependent upon the position of the member according to a second relationship different from the first relationship when a second predetermined condition exists.

2. The braking system of claim 1, further comprising at least one controller operatively connected to the actuator to control the value of the actuator characteristic; and at least one sensor configured to monitor at least one vehicle condition having a selectively variable vehicle condition value and to transmit sensor signals indicative of the vehicle condition value to said at least one controller;
   wherein said at least one controller is configured to determine whether the sensor signals indicate the existence of the first and second predetermined conditions; and
   wherein said at least one controller causes the value of the actuator characteristic to be related to the position of the member according to the first relationship when said at least one controller determines that the sensor signals indicate the existence of the first predetermined condition; and
   wherein said at least one controller causes the value of the actuator characteristic to be related to the position of the member according to the second relationship when said at least one controller determines that the sensor signals indicate the existence of the second predetermined condition.

3. The braking system of claim 2, wherein said at least one sensor is a communications receiver configured to receive communication signals from an offboard signal source.

4. The braking system of claim 2, further comprising a data storage medium; wherein said at least one controller is configured to generate a set of data by recording the value of the vehicle condition in the data storage medium at a plurality of time intervals.

5. The braking system of claim 4, wherein said at least one controller is configured to statistically analyze the set of data; and wherein said first and second predetermined conditions are statistical conditions present in the set of data.

6. The braking system of claim 1, wherein said braking system actuator is a force feedback actuator operatively connected to the member to selectively resist movement of the member; and wherein said actuator characteristic is resistance provided to the movement of the member.

7. The braking system of claim 1, further comprising a rotatable wheel;
and wherein said braking system actuator is operatively connected to the wheel to provide selective resistance to the rotation of the wheel.

8. A method of controlling a brake system in a vehicle characterized by a vehicle condition having a variable vehicle condition value, the method comprising:
monitoring the variable vehicle condition value;
monitoring the position of a movable member of a driver-operable input device;
determining whether the variable vehicle condition value indicates that a predetermined condition exists; and
causing an actuator characteristic of a braking system actuator to be dependent upon the position of the movable member in accordance with a first relationship in response to the variable vehicle condition value not indicating that the predetermined condition exists; and
causing the actuator characteristic of the braking system actuator to be dependent upon the position of the movable member in accordance with a second relationship in response to the variable vehicle condition value indicating that the predetermined condition exists.

9. The method of claim 8, wherein said monitoring the variable vehicle condition value includes receiving wireless signals from an offboard source.

10. The method of claim 9, wherein said signals are indicative of the geographic location of the vehicle.

11. The method of claim 9, wherein said signals are indicative of traffic conditions.

12. The method of claim 9, wherein said signals are indicative of weather conditions.

13. The method of claim 8, wherein said monitoring the variable vehicle condition value includes monitoring a driver-operable mode selector device; and wherein said predetermined condition is the selection of a braking system mode through the selector device.

14. The method of claim 8, further comprising generating a set of data by recording the vehicle condition value at a plurality of time intervals; and wherein said determining whether the variable vehicle condition value indicates that a predetermined condition exists includes analyzing the set of data; and wherein said predetermined condition is a statistical condition of the set of data.

15. A braking system for a vehicle comprising:
a driver-operable control input device having a selectively movable member; and
a braking system actuator having an actuator characteristic with a selectively variable actuator characteristic value;
wherein the braking system is sufficiently configured such that the variable actuator characteristic value is a first function of the position of the member when a first predetermined condition exists; and wherein the braking system is sufficiently configured such that the variable actuator characteristic value is a second function of the position of the member when a second predetermined condition exists.

* * * * *